UNITED STATES PATENT OFFICE 2,624,716

STABILIZED PLASTICIZED POLYVINYL COMPOSITIONS

Malcolm Kent Smith, Elizabeth, N. J., assignor to The Baker Castor Oil Company, Jersey City, N. J., a corporation of New Jersey No Drawing. Application July 8, 1950,
Serial No. 172,783

9 Claims. (Cl. 260—22)

This invention relates to the stabilization and plasticization of certain polyvinyl ester compositions, and more particularly to mixtures of specific polyvinyl esters, such as polyvinyl chloride, vinyl chloride-vinyl acetate copolymers containing from about 85% to about 92% by weight of vinyl chloride, or vinyl chloride-vinylidene chloride copolymers containing from about 95 to about 99% by weight of vinyl chloride, with a plasticizing modifier comprising a linear polyester having a molecular weight of from about 1700 to about 8000, which is formed by the interaction of a glycol or aliphatic acid monoester of a trihydric alcohol with a dicarboxylic acid, and with a stabilizer comprising an alkaline earth ricinoleate.

These particular vinyl resins plasticized with the linear polyesters herein described are exceptionally well stabilized by incorporating therein an alkaline earth ricinoleate, preferably barium ricinoleate, as a stabilizer therefor. Films of these particular vinyl resins, thus plasticized and stabilized, exhibit little or no change in color and virtually no change in flexibility after extremely severe aging. Furthermore, when these stabilized vinyl resin compositions are shaped by molding, the ricinoleate soap acts as an effective mold release agent.

While certain alkaline earth ricinoleates have been recognized in the prior art as additives to certain vinyl resins, I have made the surprising discovery that, in contradistinction to the prior art teachings, the stabilizing effectiveness of such compounds is entirely absent when such compounds are utilized with certain commercial plasticizers in the modification of certain vinyl resins. Thus, for example, alkaline earth ricinoleates do not stabilize vinyl resins plasticized with acetoxyricinoleic acid esters, and do not stabilize vinyl chloride-vinyl acetate copolymers containing from about 93 to about 95% by weight of vinyl chloride, based on the total resin, when such copolymers are plasticized with the linear polyesters described in this specification. However, the alkaline earth ricinoleates are particularly suitable stabilizers for other particular combinations of plasticizers and vinyl resins. And the compositions of this invention are particularly outstanding in their properties as a result of the effective cooperation of the stabilizer and the plasticizer with particular vinyl resins, namely, polyvinyl chloride, vinyl chloride-vinyl acetate copolymers containing from about 85 to about 92% by weight of vinyl chloride, as well as vinyl chloride-vinylidene chloride copolymers containing from about 95% to about 99% by weight of vinyl chloride.

The amount of the stabilizer which may be used in practicing this invention is normally from about 0.5 to about 3% by weight, based on the resin content. In making pigmented films, it is satisfactory to use more than 3% of the stabilizer; 3% representing the maximum amount which can be used to produce a clear film without causing cloudiness. Although barium ricinoleate has been found to produce optimum results in the compositions of this invention, other alkaline earth ricinoleates may be effectively used, such as calcium ricinoleate or strontium ricinoleate. The results set forth hereinbelow illustrate the practice of the invention with barium ricinoleate, but calcium and strontium ricinoleates also may be utilized similarly to afford the advantages of the invention.

The plasticizers used in practicing this invention in combination with certain specific vinyl resins and an alkaline earth ricinoleate are in general those linear polyesters having a molecular weight of from about 1700 to about 8000. In general, these polyesters are formed by the interaction of glycols or aliphatic acid monoesters of trihydric alcohols with a dicarboxylic acid.

The glycols which may be used in the formation of the polyesters with straight carbon-chain dicarboxylic acids are aliphatic glycols having from 3 through 10 or more carbon atoms per molecule, such as propylene glycol, alphabutylene glycol, beta-butylene glycol, butanediol-1,3, octanediol-1,3, and the like. Such glycols should have at least one hydroxyl group on a non-terminal carbon atom, as do those which are listed as being exemplary. When branched carbon-chain dicarboxylic acids are used in forming the polyesters, glycols having 2 or more carbon atoms per molecule and in which both hydroxyl groups are on terminal carbon atoms can be used, e. g., ethylene glycol, trimethylene glycol, hexamethylene glycol, decamethylene glycol, and diethylene glycol.

Typical acids which may be esterified with glycerine or other trihydric alcohols, such as butanetriol-1,2,3, and pentaglycerol (methyl-trimethylol-methane), to form esters suitable for reaction with dicarboxylic acids to form linear polyesters are those which may be derived from non-drying fatty oils, e. g., vegetable oils, as by hydrolysis. Suitable acids include saturated and mono-unsaturated aliphatic acids having from about 6 to about 22 carbon atoms per molecule, of which the following are exemplary: heptanoic acid, palmitic acid, margaric acid, dicetylacetic acid, myristoleic acid, oleic acid, and erucic acid, undecylenic acid, caproic acid, pelargonic acid.

The dibasic carboxylic acids used in the preparation of the linear polyesters (said acids being interacted with the indicated glycols or aliphatic acid monoesters of trihydric alcohols) are those aliphatic saturated acids having from 2 through 16 carbon atoms per molecule, such as malonic acid, succinic acid, glutaric acid, adipic acid, pimelic acid, azelalic acid, sebacic acid, brassilic acid, and hexadecamethylenedicarboxylic acid. The foregoing dicarboxylic acids are particularly suitable for reaction with monoesters of trihydric alcohols and with glycols having a non-terminal hydroxyl group. Branched-chain dicarboxylic acids, such as methyl succinic acid, dimethyl succinic acids, and beta-methyl adipic acid, are suitable for reaction with the indicated monoesters and glycols, and, in addition, with glycols having only terminal hydroxyl groups.

The linear polyesters prepared from the indicated pairs of reactants are flexible compounds suitable for use as plasticizers of, e. g., vinyl halide resins. The distinguishing feature of such polyesters is that each monomer unit contains a branched carbon-chain structure. When linear polyesters are formed which do not contain such a structure, they are crystalline in character and are unsuitable as plasticizers. In general, it may also be stated that the monomer units should contain a minimum of 7 carbon atoms, as, when fewer carbon atoms are present, cyclic structures and not linear polymers are formed under polymerizing conditions. The preparation of the linear polyesters described herein is well known, as disclosed in British Patent No. 586,826 and the patents cited therein.

Further examples of linear polyesters suitable for use as plasticizers in the present invention are polyisopropylene sebacate; polyisopropylene succinate; polyisopropylene sebacate maleate (98 mol per cent sebacate, 2 mol per cent maleate); and polyisopropylene succinate maleate (98 mol per cent succinate, 2 mol per cent maleate), all of which are characterized by their gummy, noncrystalline structure.

The alkaline earth ricinoleates may be prepared by the following method which relates to the production of barium ricinoleate. 12.7 g. of sodium hydroxide are dissolved in 125 g. of water; the mixture is brought to a boil; and, then, 100 g. of methyl ricinoleate are slowly added. The solution is diluted to 1000 cc. with cold water and remains clear. With this diluted solution at 30° C., 45.0 g. of barium chloride (BaCl₂.2H₂O) dissolved in 405 g. of water, are slowly added. A fine white precipitate forms; this is separated by filtration, receives two water washes and one methyl alcohol wash, is pressed reasonably free of liquid, and is then air-dried. The dried product is slightly waxy, and may be ground into a fine powder for use as a vinyl resin stabilizer.

If desired, barium ricinoleate may be prepared directly from castor oil as follows: 12.8 g. of sodium hydroxide are dissolved in 125 g. of water, and the solution is brought to a boil. 100 g. of castor oil are then added, and the resulting solution is diluted to 1000 cc., the solution remaining clear. With this solution at 30° C., 48.0 g. of barium acetate mono-hydrate, which is dissolved in 500 cc. of water, is added. A fine, white precipitate forms; this precipitate receives four water washes, being filtered free of liquid and returned to a fresh lot of water for redispersion each time. This extra washing procedure is used to assure complete removal of glycerine. A final wash is made with methyl alcohol and, after the precipitate is separated from the alcohol by filtration, this precipitate is gently pressed and then air dried. The final soap is ground to a truly fine powder, which is highly suitable for use as a vinyl resin stabilizer.

The most effective proportions for the plasticizers use in the stabilized plasticized vinyl resin compounds of this invention are as follows: Amounts of the plasticizer, namely the linear polyester, may range from about 15 to about 55% by weight, based on the weight of the total composition. When the lower amounts of polyester are used, the resulting compositions are not too flexible but are useful in the usual molding process. When the higher amounts of polyester are used, films prepared from the resulting composition are very flexible and have improved low temperature flexibility. In general, the optimum amount of linear polyester plasticizer is from about 25 to about 40% by weight, based on the total composition.

As stated above, the amount of the alkaline earth ricinoleate stabilizer, for the production of clear films, should not be in excess of 3% by weight, based on the vinyl resin. In pigmented films, quantities of the stabilizer may exceed 3% by weight, on the same basis.

The stabilizers described herein have been found to be specifically and advantageously useful with compositions comprising the particular species of vinyl resins described above and a linear polyester plasticizer as described above. It has been found that these stabilizers provide little or no advantage when used with vinyl chloride-vinyl acetate copolymers having in excess of about 92% vinyl chloride by weight, even when the plasticizers described herein are used in combination therewith.

The experimental work reported below involved the testing of various vinyl chloride resin compositions. The following terminology is used herein to designate the several vinyl resins. Vinyl resin A corresponds to polyvinyl chloride. Vinyl resin B is a vinylidene chloride-vinyl chloride copolymer containing over 95% of vinyl chloride. Vinyl resin C is a vinyl chloride-vinyl acetate copolymer having from 93% to 95% by weight of vinyl chloride. Vinyl resin D is a vinyl chloride-vinyl acetate copolymer containing from 88.5% to 90.5% by weight of vinyl chloride. The following empirical data demonstrate the improved properties imparted to the various films, except those of vinyl resin C, by the presence therein of barium ricinoleate as a stabilizer therefor and a linear polyester as the plasticizer therefor, as contrasted with the results obtained on vinyl resin films containing other known plasticizers together with barium ricinoleate. In the examples, the films contain 70 parts by weight of the vinyl resin indicated, 30 parts by weight of the plasticizer indicated, and, when stabilized, 2 parts by weight of barium ricinoleate. The films were 0.01" thick. In the following charts, those columns headed "O" contain the data on the unstabilized compositions, while those columns headed "S" include the data on the compositions containing the stabilizer in accordance with the present invention.

Heat aging, sunlight aging, and/or accelerated light aging tests were performed on films containing vinyl resins A, B, C, and D. Examples 1 through 4 present the results obtained. In the heat aging tests, the films were placed in an oven for 120 hours at 100° C. In the sunlight aging tests, the films were exposed to sunlight for a total of 300 hours. In the accelerated light aging tests, the films were exposed for 100 hours to ultraviolet light as produced by a carbon arc in a Fade-O-Meter, a product of the Atlas Electrical Devices Co.

It is apparent that the combinations of the present invention are superior to compositions containing the plasticizer used in this invention but without the stabilizer of this invention, as well as to compositions containing other plasticizers in combination with the stabilizer of this invention. Example 3 shows that the combination of plasticizer and stabilizer in accordance with this invention is not effective with vinyl resin C.

*Example 1.—Vinyl resin A*

| Plasticizer | Light aging—100 hrs.—Fade-O-Meter | | Sunlight aging | | | |
|---|---|---|---|---|---|---|
| | | | 200 hrs. | | 300 hrs. | |
| | O | S | O | S | O | S |
| Linear polyester derived from propylene glycol and sebacic acid (Brookfield viscosity at 40° C.: 750 poises). | Brown spots. | Colorless. | Brown spots. | Colorless. | Dark purplish brown. | Faint brown spots. |
| Linear polyester derived from glyceryl mono-oleate and azelaic acid (Brookfield viscosity at 40° C.: 750 poises). | ___do___ | ___do___ | ___do___ | ___do___ | ___do___ | Do. |
| Linear polyester derived from diethylene glycol and betamethyl adipic acid (Brookfield viscosity at 40° C.: 900 poises). | ___do___ | ___do___ | ___do___ | ___do___ | ___do___ | Do. |
| 2-methoxyethyl ester of 12-acetoxy ricinoleic acid. | | | Off-white. | Tan. | Light reddish brown. | Light reddish brown. |
| 2-methoxyethyl ester of 12-acetoxy stearic acid ($I_2$ no.: 30). | | | | | Reddish brown. | Mottled brown. |
| Methyl 12-acetoxy stearate ($I_2$ no.: 40). | | | | | | Mottled reddish brown. |

*Example 2.—Vinyl resin B*

| Plasticizer | Heat aging—120 hrs. at 100° C. | | Light aging—100 hrs.—Fade-O-Meter | | Sunlight aging | | | |
|---|---|---|---|---|---|---|---|---|
| | | | | | 200 hrs. | | 300 hrs. | |
| | O | S | O | S | O | S | O | S |
| Linear polyester derived from propylene glycol and sebacic acid (Brookfield viscosity at 40° C.: 750 poises). | Brown. | Pale tan. | Brown spots. | Colorless. | Speckled red brown. | Colorless. | Very dark brown. | Off-white. |
| Linear polyester derived from glyceryl mono-oleate and azelaic acid (Brookfield viscosity at 40° C.: 750 poises). | ___do___ | ___do___ | ___do___ | ___do___ | ___do___ | ___do___ | ___do___ | Do. |
| Linear polyester derived from diethylene glycol and beta-methyl adipic acid (Brookfield viscosity at 40° C.: 900 poises). | ___do___ | ___do___ | ___do___ | ___do___ | ___do___ | ___do___ | ___do___ | Do. |
| 2-methoxyethyl ester of 12-acetoxy ricinoleic acid. | | Yellow. | | | | | | |
| 2-methoxyethyl ester of 12-acetoxy stearic acid ($I_2$ no.: 30). | | | | | Dirty yellowish gray. | Light mottled reddish brown. | Mottled reddish brown. | Dull mottled reddish brown. |
| Methyl 12-acetoxy ricinoleate. | | Yellow. | | | | | | Light mottled reddish brown. |
| Methyl 12-acetoxy stearate ($I_2$ no.: 40). | | | | | | | Light reddish brown spots. | Mottled reddish brown. |
| Di-octyl phthalate. | Off-white. | Light tan. | | | | | | |

*Example 3.—Vinyl resin C*

| Plasticizer | Sunlight aging | | | |
|---|---|---|---|---|
| | 200 hrs. | | 300 hrs. | |
| | O | S | O | S |
| Linear polyester derived from propylene glycol and sebacic acid (Brookfield viscosity at 40° C.: 750 poises). | Dark reddish brown. | Dark reddish brown. | Jet black. | Jet black. |
| Linear polyester derived from glyceryl mono-oleate and azelaic acid (Brookfield viscosity at 40° C.: 750 poises). | ___do___ | ___do___ | ___do___ | Do. |
| Linear polyester derived from diethylene glycol and beta-methyl adipic acid (Brookfield viscosity at 40° C.: 900 poises). | ___do___ | ___do___ | ___do___ | Do. |

Example 4.—Vinyl resin D

| Plasticizer | Heat aging—120 hrs. at 100° C. | | Sunlight aging | | | |
|---|---|---|---|---|---|---|
| | | | 200 hrs. | | 300 hrs. | |
| | O | S | O | S | O | S |
| Linear polyester derived from propylene glycol and sebacic acid (Brookfield viscosity at 40° C.: 750 poises). | Muddy light brown. | Slightly brown. | Brown spots. | Colorless. | Dark reddish brown. | Colorless. |
| Linear polyester derived from glyceryl mono-oleate and azelaic acid (Brookfield viscosity at 40° C.: 750 poises). | ----do---- | ---do---- | ---do---- | ----do---- | ----do---- | Do. |
| Linear polyester derived from diethylene glycol and beta-methyl adipic acid (Brookfield viscosity at 40° C.: 900 poises). | ----do---- | ---do---- | ---do---- | ----do---- | ----do---- | Do. |
| 2-methoxyethyl ester of 12-acetoxy ricinoleic acid. | | | Off-white. | Light yellow brown. | Light reddish brown. | Reddish brown. |
| Methyl 12-acetoxy ricinoleate. | | | | | | Mottled reddish brown. |
| Methyl 12-acetoxy stearate ($I_1$ no.: 40). | | | | | | Do. |

NOTE.—Films, on which data are presented in this and the other charts, contain 70 parts of vinyl resin, 30 parts of plasticizer, and, when stabilized, 2 parts of barium ricinoleate; the films are 0.01" thick.

In view of the many changes and modifications that may be made without departing from the principles underlying the invention, reference should be made to the appended claims for an understanding of the scope of the protection afforded the invention.

What is claimed is:

1. A composition of matter comprising (1) a polymerization product selected from the group consisting of polyvinyl chloride, a vinyl chloride-vinyl acetate copolymer containing from 85% to 92% by weight of vinyl chloride, and a vinyl chloride-vinylidene chloride copolymer containing from about 95% to about 99% by weight of vinyl chloride, (2) a linear polyester formed by the interaction of a dicarboxylic acid with a compound selected from the group consisting of glycols and aliphatic acid mono-esters of trihydric alcohols, said polyester having a molecular weight of from about 1700 to about 8000 and being characterized by having a branched carbon-chain structure, and (3) an alkaline earth ricinoleate.

2. The composition of claim 1, in which said linear polyester is present in an amount of from about 15 to about 55% by weight, based on the total composition.

3. The composition of claim 1, in which said alkaline earth ricinoleate is present in an amount of from about 0.5 to about 3.0 percent by weight, based on the total composition.

4. The composition of claim 1, in which said polymerization product is a vinyl chloride-vinyl acetate copolymer containing from 85% to 92% by weight of vinyl chloride.

5. The composition of claim 1, in which said polymerization product is a vinyl chloride-vinylidene chloride copolymer containing from about 95% to about 99% by weight of vinyl chloride.

6. The composition of claim 1, in which said linear polyester is formed from propylene glycol and sebacic acid, and has a Brookfield viscosity of from about 700 to about 800 poises at 40° C.

7. The composition of claim 1, in which said linear polyester is formed from glyceryl mono-oleate and azelaic acid, and has a Brookfield viscosity of from about 700 to about 800 poises at 40° C.

8. The composition of claim 1, in which said alkaline earth ricinoleate is barium ricinoleate.

9. The composition of claim 1, in which said polymerization product is polyvinyl chloride.

MALCOLM KENT SMITH.

REFERENCES CITED

The following references are of record in the file of this patent:

UNITED STATES PATENTS

| Number | Name | Date |
|---|---|---|
| 2,075,543 | Reed et al. | Mar. 30, 1937 |
| 2,491,923 | Johnson | Dec. 20, 1949 |
| 2,514,424 | Smith | July 11, 1950 |

OTHER REFERENCES

Modern Plastics, December 1949, pages 111 and 112.